US007963257B2

(12) United States Patent
Houtz

(10) Patent No.: US 7,963,257 B2
(45) Date of Patent: Jun. 21, 2011

(54) SUSTAINABLE WASTE HEAT MANAGEMENT SYSTEM

(76) Inventor: Scott Houtz, Lewisburg, PA (US)

( * ) Notice: Subject to any disclaimer, the term of this patent is extended or adjusted under 35 U.S.C. 154(b) by 0 days.

(21) Appl. No.: 12/760,602

(22) Filed: Apr. 15, 2010

(65) Prior Publication Data

US 2010/0192877 A1    Aug. 5, 2010

(51) Int. Cl.
     *F22B 1/18*          (2006.01)
(52) U.S. Cl. .................. 122/7 R; 122/20 B; 60/648
(58) Field of Classification Search .................. 122/7 R, 122/20 B; 237/16, 19; 60/648, 661, 664
See application file for complete search history.

(56) References Cited

U.S. PATENT DOCUMENTS

| | | | | |
|---|---|---|---|---|
| 3,106,192 | A | * | 10/1963 | Hingst ........................ 122/7 R |
| 4,084,745 | A | | 4/1978 | Jones |
| 4,224,109 | A | | 9/1980 | Flockenhaus |
| 4,246,071 | A | | 1/1981 | Wagener et al. |
| 4,314,601 | A | | 2/1982 | Guiffre et al. |
| 4,374,506 | A | * | 2/1983 | Whalen ....................... 122/20 B |
| 5,588,296 | A | | 12/1996 | Aparici |
| 5,609,730 | A | | 3/1997 | Shimooka et al. |
| 6,321,552 | B1 | * | 11/2001 | Frederiksen ................. 62/238.3 |
| 6,543,526 | B2 | | 4/2003 | Jacobs |
| 7,331,312 | B2 | * | 2/2008 | Choi ........................... 122/20 B |
| 7,730,854 | B2 | * | 6/2010 | VanWees et al. ............. 122/7 R |
| 7,841,304 | B2 | * | 11/2010 | Van Wees et al. ............ 122/7 R |
| 2007/0183966 | A1 | * | 8/2007 | Nakagawa et al. ......... 423/648.1 |
| 2009/0017173 | A1 | | 1/2009 | Kozman et al. |

FOREIGN PATENT DOCUMENTS

JP          61004794 A     1/1986

OTHER PUBLICATIONS

Scott Houtz, Oven Heat Recovery Presentation Prepared for American Bakers Association; USA, Jun. 2006.

* cited by examiner

*Primary Examiner* — Gregory A Wilson
(74) *Attorney, Agent, or Firm* — The Law Firm of Andrea Hence Evans, LLC

(57) ABSTRACT

A self-contained waste heat recovery system for a commercial oven provides circulating an energy source to an oven heating system. The oven heating system recovers heat from an oven stack or downstream of oxidizer if used and distributes the heat to bakery systems such as proofers, tray washers, process water heating and other points of use. The system features secondary loops to ensure constant flow of the energy source throughout the system optimizing energy savings.

16 Claims, 3 Drawing Sheets

SUSTAINABLE WASTE HEAT MANAGEMENT SYSTEM

FIELD OF THE INVENTION

The present invention relates in general to a heat recovery system in a commercial or industrial environment which recycles heat from a manufacturing process.

BACKGROUND OF THE INVENTION

Steam boilers have been the traditional method of providing process heating in bakeries for many years. However, energy costs have increased and steam heat is not efficient. Also, steam boilers are noisy and expensive to maintain. Reducing or eliminating boilers in heating systems improve air quality and greatly reduce or eliminate chemical or softening requirements.

In commercial or industrial environments, cooking equipment such as ovens generate significant amounts of heat that is vented, wasted and not recovered. To cut cost, heat recovery systems have been implemented that recover heat from the ovens exhaust stream and the heat is typically discharged. Heat recovery systems that incorporate hot water coils into oven stacks often fail due to rupturing of the coils. Other heat recovery systems can cause condensation issues, affect oven operation and simply put, are not effective.

SUMMARY OF THE INVENTION

This invention introduces a heat recovery system that distributes and controls the energy source and captures the generated waste heat from ovens or oxidizer exhaust streams and manages, recycles and diverts the captured waste heat.

An aspect of an embodiment of the invention provides a self-contained heat recovery system that decreases the system unit footprint and allows easy installation.

A further aspect of an embodiment of the invention provides a manual override system in the event of a system failure.

A further aspect of an embodiment of the invention provides a heat recovery system which prevents overheating, over pressurization and provides constant flow.

Additional aspects, objectives, features and advantages of the present invention will become apparent from the following description of the preferred embodiments with reference to the attached drawings.

DETAILED DESCRIPTION OF THE INVENTION

Figure 1A:
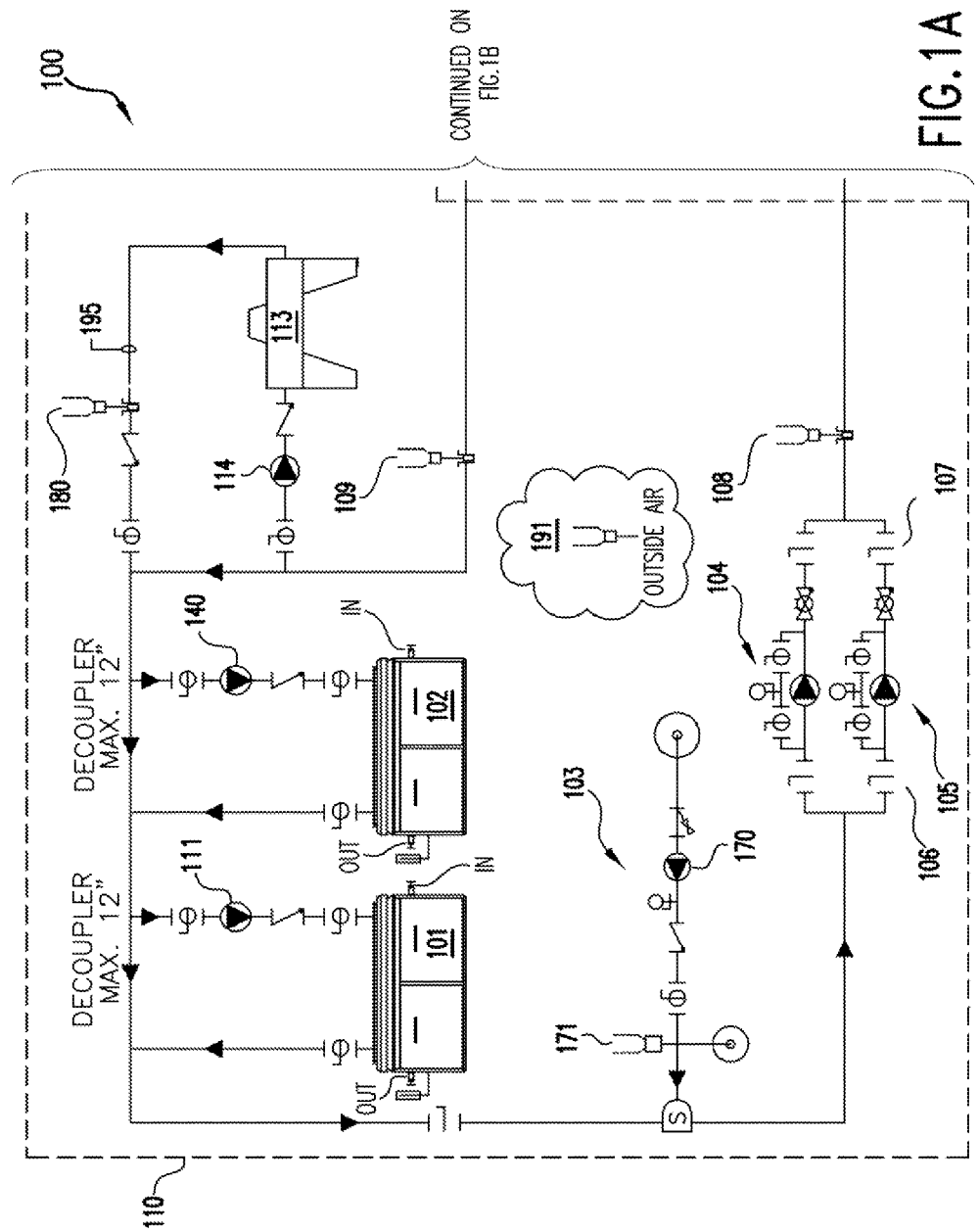
FIG. 1a is a schematic representation of the waste heat recovery system.
Figure 1B:
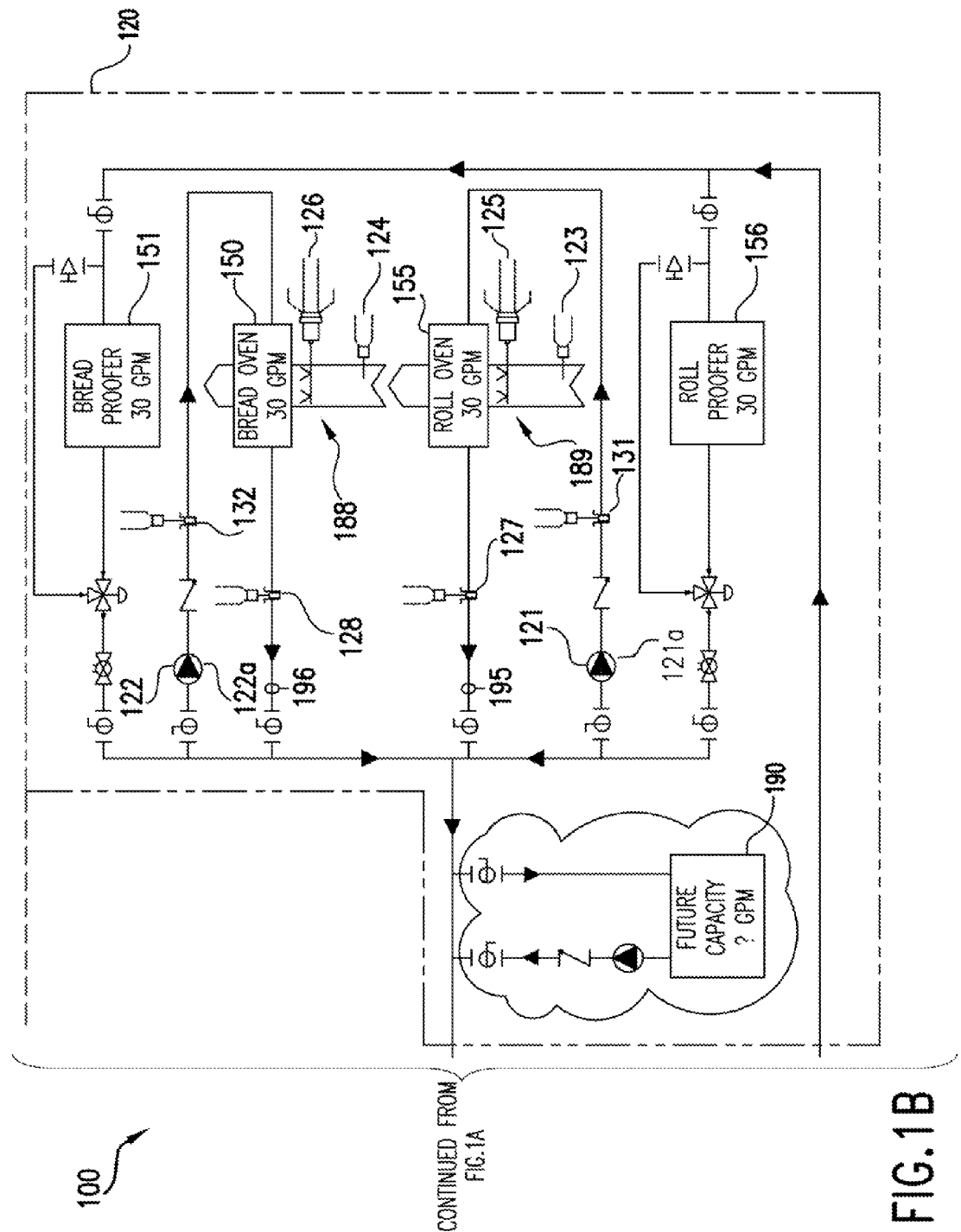
FIG. 1b is a schematic representation of the waste heat recovery system continued from FIG. 1a illustrating the oven heating system.

FIGS. 1a and 1b are a schematic representation of the waste heat recovery system 100. The waste heat recovery system 100 is self-contained, as shown at 110. The features shown at 110 are mounted on a skid. Rather than having the features at numerous locations, the system 100 can be mounted at one location thereby increasing system reliability and functionality, decreasing the unit footprint and allowing the system to be installed by tradesmen with decreased skill level. The system is contained in a manner such that the system can be easily connected to an oven heating system 120. The oven described is a commercial baking oven for illustrative purposes. However, the waste heat recovery system 100 may be used with any commercial or industrial oven. The oven heating system 120 features external boilers 101, 102 which are part of the waste heat recovery system 100. Heat from the oven heating system 120 is transmitted to a fluid contained within the heat exchanger. The boilers 101, 102 provide auxiliary heating when recovered heat from the oven heating system 120 is not sufficient to meet the process loads. Heat from the oven heating system 120 and as required from the boilers 101, 102 is distributed throughout the system to end uses Glycol management system 103 maintains desired pressure.

Figure 2:
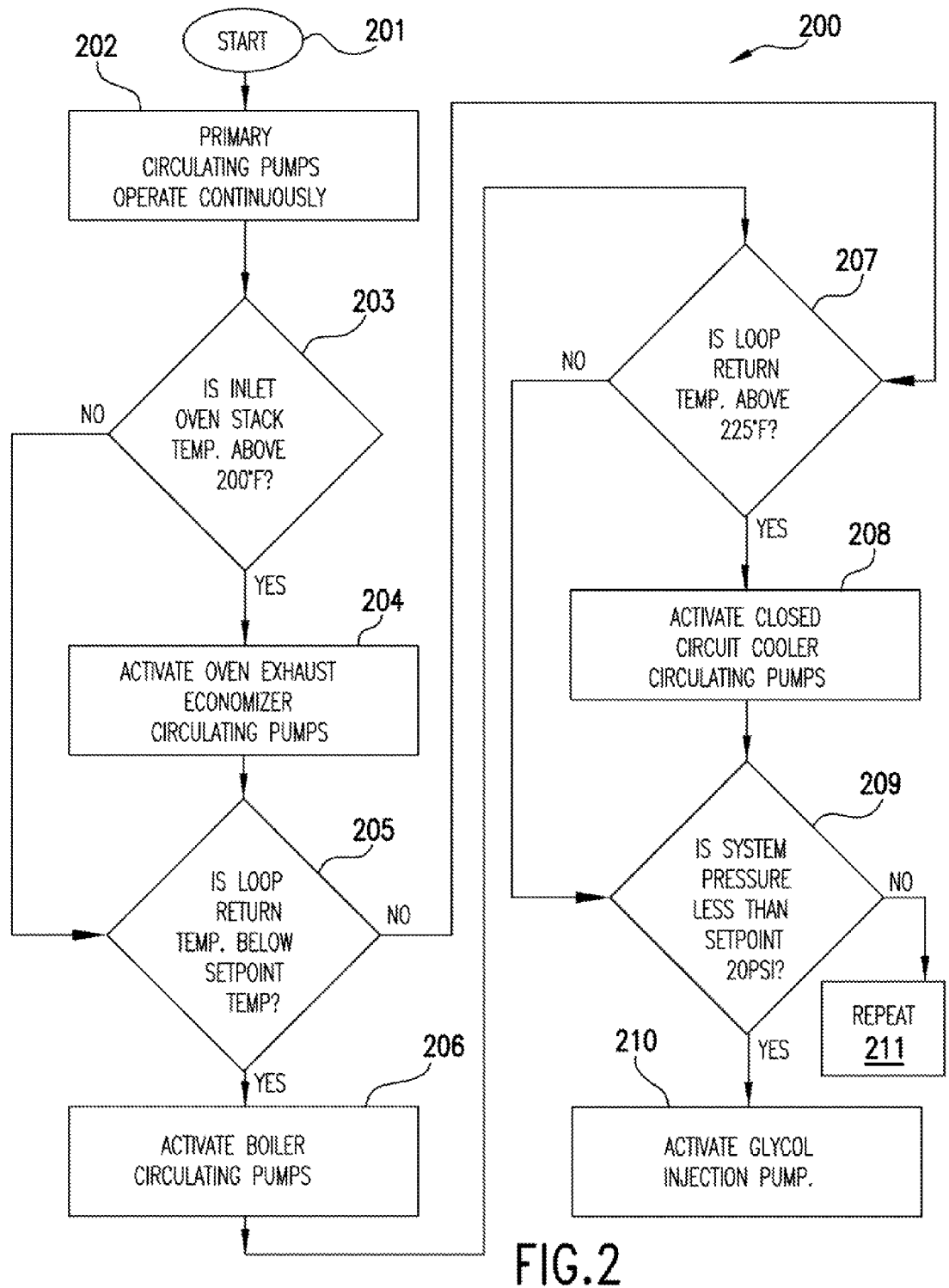
FIG. 2 is a flow chart illustrating the control system of the waste heat recovery system in operational mode.

The system 100 comprises a web based controller system 200, illustrated in FIG. 2. The controller system 200 is web-based and controls or operates the systems in an operational mode, heat recovery mode, a shutdown mode and a low ambient mode.

In an operational mode, control panel rotary switch or oven exhaust economizers 188, 189 active status, and or central communication bus will index the heat recovery system 100 to an operational state. Primary circulating pump 104 or 105 will receive a start command at 201 and will operate continuously 202 with automatic lead/lag control designed to maintain equal runtime on pumps and in case of single pump failure automatic changeover to remaining pump. The primary circulating pumps 104, 105 circulate an energy source to end uses and the oven heating system 120. The energy source is a heat transfer fluid such as glycol or water. The energy source may be a different heat transfer fluid. The oven exhaust economizers 188,189 are part of the oven heating system 120 and are installed downstream when a oxidizer is used. The exhaust oven stack economizers 188,189 capture a portion of the waste heat. Oven exhaust economizer circulating pumps 121,122 will be energized and provide constant fluid circulation through respective oven stack economizer whenever respective inlet oven stack temperature 123,124 is above 200° F. with respective face and bypass dampers 125, 126 modulated to maintain a 220° F. supply temperature 127,128. If the inlet oven stack temperature is above 200° F. at 203, the oven exhaust economizer circulating pumps are activated at 204. Inlet oven stack temperature sensors 123,124 detect the temperature of the energy source flowing in oven stacks such as the bread oven stack 150 and the roll oven stack 155, located in the oven heating system, for example. Temperature sensors 127,128 detect the loop supply temperature. The loop supply temperature is the temperature of the energy source when it is flowing throughout the oven heating system 120 specifically when the energy source exits the roll oven stack 155 and bread oven stack 150.

The oven system 120 further comprises at least one commercial oven such as a bread oven 150 or a roll oven 155, as well as end uses such as roll proofers 156 and bread proofers 151. The proofers 156, 151 are chambers used in baking that encourage fermentation of dough by yeast through warm temperatures and controlled humidity. The warm temperatures increase the activity of the yeast, resulting in increased carbon dioxide production and a higher, faster rise. Dough is typically allowed to rise in the proofer before baking in its respective oven, 155, 150. The oven heating system 120 also features economizer pumps 121 and 122. Each economizer pump 121, 122 comprises a current sensor, 121a and 122a that detects the current of the energy source. Temperature sensors 131, 132 detect the temperature of the energy source discharged from respective pumps, 121 and 122.

The heat recovery system 100 further comprises boiler circulating pumps 140,111 for outdoors boilers 102, 101, respectively. Boiler circulating pumps 140, 111 will be staged at 206 whenever loop return temperature determined by temperature sensor 109 is below setpoint temperature as indicated below and thru integral flow switch individual boiler control circuits will be enabled and temperature maintained at 200° F. at 205 thru self-contained operating and safety controls. The loop return temperature is the temperature of the energy source when it is returned from distribution throughout an oven heating system. The system setpoint temperature is a desired temperature to be maintained for the heat recovery system 100 to be in an operational mode. Loop return temperature sensor 109 determines whether or not sufficient heat was recovered to supply to end uses and dictates the operational mode of system 100. If sufficient heat was recovered which should normally range (adjustable) between 200-225° F. no action is required, below 200° F. copper tube boilers 101,102 or other heat addition means are used to elevate fluid temperature to 200° F., above 225° F. closed circuit fluid cooler 113 will operate to reject additional heat. Closed circuit fluid coolers are typically not required in systems with oxidizers that normally will allow 100% face and bypass dampers.

Outlined below is typical staging for heat addition (Setpoint temperature of Boiler 101 & boiler pump 111 Loop Return 200° F.=Supply 190-200° F.)

(Setpoint temperature of Boiler 102 & boiler pump 140 Loop Supply<185° F.)

The heat recovery system further comprises a closed circuit fluid cooler 113 and a respective closed circuit fluid cooler pump 114 that will operate at 208 if loop return temperature determined by temperature sensor 109 is above 225° F. at 207 with loop supply temperature, determined by temperature sensor 180, maintained at 170° F. through self-contained operating and safety controls. Closed circuit cooler 113 (fluid or dry cooler) is applied in instances where the ovens airside pressure drop allowance is minimal and recovery device can only incorporate a 50% bypass damper when oxidizers are used 100% face and bypass may be utilized. In these instances a problem arises when demand is less than the recovered energy even under full bypass conditions and overheating and over pressurization of the loop can occur. Closed circuit coolers are incorporated into the design on the entering side of the system 100 to reject excess heat to the atmosphere to support this condition.

Supply glycolic fluid will be distributed throughout the plant to proofers' 151, 156 dry heat coils with 3-way control valves modulated open if proofer temperature falls below setpoint temperature with actuation signal (4-20 MA) provided by the manufacturer. An aspect of an embodiment of the invention features an energy source management system 103 that senses the pressure of the self-contained waste heat recovery system loop and injects fluid (glycol/water) in the waste heat recovery system if the pressure is below a setpoint pressure at 209. If the pressure is above the setpoint pressure, the control system 200 will repeat 202 at 211. The energy source waste heat recovery system 103 features a glycol injection pump 170 that will be energized at 210 to maintain a system pressure of 20 PSI as controlled by pressure switch 171. The glycol management system 103 is required to maintain loop pressurization and also to replenish any fluid losses that may occur from piping joints, seals or other points of leakage. Glycol management systems are many times contained in special spill containment units in event of drum leakage.

The control system 200 features safety controls that include high temperature limits for boilers, low and high gas pressure switches, as well as low water cutouts. Low glycol management tank level and high or low temperature loop conditions (235/180° F.) will trigger an audible alarm. Status devices will include system primary circulating pumps 104, 105 status detected by current sensors 106, 107, heat recovery return and discharge glycolic temperatures determined by calculating the temperature difference between temperature sensors 127,131, and 128,132 with BTU saving calculations based on balanced flow, and loop supply and return glycol temperatures determined by temperature sensors 108, 109. Primary circulating pumps 104,105 will automatically alternate in event of a pump malfunction. Boiler circulating pumps 140 and or 111 will operate for 15 additional minutes to provide flow through boilers 101, 102 after full heat recovery mode is resumed to place the heat recovery system 100 in operational mode.

Control panel rotary switch, and or central communication bus will index system to shutdown mode providing that oven exhaust economizer status is not operational as sensed by inlet temperature sensors 123, 124, which will disable all circulating pumps 104,105, boilers 101,102 and the fluid cooler 113.

Temperature sensor 191 determines the temperature of the outside air. Special operational provisions apply when the outside air temperature is less than minus 20° F., or low ambient mode. In low ambient mode, the heat recovery system 100 will receive an override command that will operate the system 100 in operational mode and will energize pumps 111,140 providing flow through boilers 101, 102 and closed circuit fluid cooler loop temperature sensor 180 will cycle pump 114 to maintain a minimum temperature of minus 20° F.

In the event of a system failure, the system 100 can be manually overridden. Starters that control circulating pumps for boilers 111,140, fluid cooler 114, oven exhaust economizers 121,122 and primary pumps 104,105 incorporate a manual override switch that in the event of controller failure can be switched to manual operation which will allow integral temperature controls to maintain loop temperatures that will help prevent overheating and or pressurization.

The system 120 is equipped for future capacity 190 as shown in FIG. 1b. If system is producing energy in excess of what is required by the average usage of the proofers then additional loads can be served that may include but not limited to process/domestic water heating, tray washers, feedwater tanks, fermentation rooms, and space and makeup air heating coils.

Secondary loops 195 and 196 provide constant flow of the energy source throughout the system 100. Constant flow assures that heat exchange devices such as boilers 101,102 and stack heat exchangers always receive proper flow regardless of primary system dynamics to prevent increased temperature rises above design and also pump energy savings by reducing primary flow head requirements. Secondary loops allow non-process loads to be incorporated into the return loop and depending on system demands if additional heat is available it can be supplied to other non-essential use points optimizing energy savings.

The invention has been described in detail with particular reference to certain preferred embodiments thereof, but it will be understood that variations and modifications can be effected within the spirit and scope of the invention.

The invention claimed is:

1. A self-contained waste heat recovery system for a commercial oven having external boilers, comprising:
    a controller for operating the system in at least one mode;
    primary circulating pumps distributing an energy source, wherein the energy source has a loop return temperature and a loop supply temperature;
    an energy source management system for managing the distribution of the energy source;
    boiler circulating pumps connected to the external boilers, wherein the boiler circulating pumps are active if the loop return temperature is below a system setpoint temperature; and
    a closed circuit fluid cooler having closed circuit fluid cooler pumps which are enabled if the loop return temperature is above the system setpoint temperature.

2. The self-contained waste heat recovery system of claim 1 further comprising a skid for mounting the system.

3. The self contained waste heat recovery system of claim 1, wherein the oven comprises an oven stack having an oven exhaust economizer that recovers heat from the oven stack or recovers heat downstream when an oxidizer is used, wherein the oven stack is connected to the system.

4. The self-contained waste heat recovery system of claim 3, wherein the at least one mode comprises a shutdown mode in which the oven exhaust economizer is not operational.

5. The self-contained waste heat recovery system of claim 3, wherein the loop return temperature is the temperature of the energy source when it is returned from distribution throughout an oven heating system.

6. The self-contained waste heat recovery system of claim 5, wherein the loop supply temperature is the temperature of the energy source when it is flowing throughout the oven heating system.

7. The self-contained waste heat recovery system of claim 3, wherein the system setpoint temperature is a desired temperature to be maintained for the system to be in an operational mode.

8. The self-contained waste heat recovery system of claim 1, wherein said energy source is a heat transfer fluid.

9. The self-contained waste heat recovery system of claim 1, wherein the at least one mode comprises a low ambient mode in which the system is overridden such that the system operates until the system setpoint temperature is maintained.

10. A self-contained waste heat recovery system for a commercial oven having an oven heating system, comprising:
    a first loop comprising primary circulating pumps distributing an energy source;
    a second loop comprising a closed circuit fluid cooler having closed circuit fluid cooler pumps which are enabled if a loop return temperature is above a system setpoint temperature; and
    an energy source management system that senses the pressure of the self-contained waste heat recovery system and injects the energy source in the waste heat recovery system if the pressure is below a setpoint pressure;
    wherein the self-contained waste heat recovery system is connected to the oven heating system such that heat is recovered by the oven heating system.

11. The self-contained waste heat recovery system of claim 10, wherein the loop return temperature is the temperature of the energy source when it is returned from distribution throughout the oven heating system.

12. The self-contained waste heat recovery system of claim 10, wherein the system setpoint temperature is a desired temperature to be maintained for the system to be in an operational mode.

13. The self-contained waste heat recovery system of claim 10, wherein the oven heating system further comprises a third loop having oven exhaust economizer pumps that recover heat from an oven stack and temperature sensors that determine an inlet oven stack temperature.

14. The self-contained waste heat recovery system of claim 13, wherein the oven exhaust economizer pumps are active whenever the inlet oven stack temperature is above setpoint temperature.

15. The self-contained waste heat recovery system of claim 14, wherein the loop supply temperature is the temperature of the energy source received from the first loop.

16. A method of recovering heat from a commercial oven, wherein the oven comprises an oven heating system, the method comprising:
    circulating an energy source through primary circulating pumps to the oven heating system;
    determining if a energy source supply temperature is at a desired temperature in the oven heating system, wherein the oven heating system comprises economizer circulating pumps;
    activating the economizer circulating pumps if an inlet oven stack temperature is above the desired temperature, wherein face and bypass dampers maintain the desired temperature such that the economizer circulating pumps recover excess heat from the oven;
    distributing the excess heat to at least one proofer;
    circulating the energy source through closed circuit fluid cooler circulating pumps if a energy source return temperature is above a set temperature to reject the excess heat; and
    providing an energy source management system that maintains a desired pressure.

* * * * *